3,318,960
CONDENSATION PRODUCTS OF HALOGEN SUBSTITUTED ALKYLENE OXIDES WITH POLYHYDRIC ALCOHOLS IN PRESENCE OF AN ALUMINUM ALCOHOLATE
Mason H. Earing, Grosse Ile, Mich., assignor to Wyandotte Chemicals Corporation, Wyandotte, Mich., a corporation of Michigan
No Drawing. Filed Aug. 14, 1963, Ser. No. 302,013
19 Claims. (Cl. 260—615)

The present invention relates to production of halogenous hydroxy ethers and is more specifically concerned with a novel process for the production of such halogenous hydroxy ethers by the reaction of halogenous alkylene oxides with alcohols in the presence of organometallic catalysts.

The products resulting from the condensation of alcohols and halogenous alkylene oxides are halogenous hydroxy monoethers and polyethers. Such compounds are useful chemical intermediates which may be employed in many reactions which require the presence of a hydroxy group, a halogen atom, or both. The compositions resulting from these reactions are in some instances resins and may be used in the preparation of resinous products. They may be used to produce epoxide compositions similar to those of U.S. Patent 2,581,464, or for other uses as listed in column 19 of the aforementioned patent.

The products produced according to the present invention are also of interest in the preparation of polyurethane products, utilizing the teachings of U.S. Patent 2,866,774. Such polyurethanes produced from halogenous hydroxy ethers have a high resistance to flame and heat.

The prior art contains numerous methods for reacting alkylene oxides and alcohols as, for example, by catalysis with acids, as disclosed in U.S. Patent 2,010,726, or with bases, as disclosed in U.S. Patent 2,723,999. Since rearrangements and other undesirable side reactions of alkylene oxides are caused by acid catalysts, a basic catalyst is usually employed in the condensation of the more common alkylene oxides, e.g., ethylene oxide, propylene oxide, or butylene oxide, with an alcohol, e.g., glycerine, ethyl alcohol, or orcinol. However, these basic catalysts are not suitable for the condensation of epoxide compounds containing an active halogen atom because of a tendency for the catalyst to attack the halogen of the oxide. For example, attempts to polymerize chloroepoxides employing an alkali metal hydroxide catalyst have resulted in the decomposition of the epoxide. Acid catalysts offer no improvement since, in addition to catalyzing rearrangements, they also promote other undesirable side reactions involving the halogen atom.

The use of a metal alcoholate catalyst avoids many of these difficulties because of its essentially neutral, amphoteric nature. However, the products of the condensation of alcohols and haloepoxides resulting from the employment of such a catalyst frequently do not have uniform properties, since they contain condensation products of both the alcohol reactant and the alcohol which forms a part of the catalyst.

It is an object of the present invention to provide a process for condensing a halogenous alkylene oxide and an alcohol without inducing substantial side reactions which might adversely affect the yield or purity of the product. Still another object is to provide a process for polymerizing halogenous alkylene oxides using an alcohol initiating compound in the presence of a metal alcoholate catalyst which results in the production of an ether having more uniform properties. Additional objects will be apparent to one skilled in the art and still other objects will become apparent hereinafter.

The foregoing and additional objects are accomplished by condensing a halogenous alkylene oxide and an alcohol in the presence of a metal alcoholate of the alcohol used as starting compound in the reaction.

One of the reactants of the present process is an alkylene oxide which contains halogen atoms. Alkylene oxides wherein the halogen is fluorine, chlorine or bromine (and therefore has an atomic weight of 19 to 80), and especially epoxidized halohydrocarbons having from 3 to 10 carbon atoms, are preferred starting materials. 1-halo-2,3-epoxyalkanes are of greatest interest. Iodine-substituted alkylene oxides may be used for some applications.

The halogenous alkylene oxides which are employed as starting materials to prepare the ethers are vicinal alkylene oxides containing an oxirane ring. The term "oxirane ring" refers to a three-membered cyclic ether group represented by the formula:

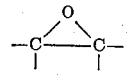

wherein the ether oxygen is bonded to adjacent carbon atoms. Representative of such polyhalogenous alkylene oxides are epichlorohydrin, epibromohydrin, epiiodohydrin, 1-fluorobutylene oxide-2,3, 4-fluoro-3-chlorobutylene oxide-1,2, 3-chlorododecylene oxide-1,2, 4-ethoxy-3-bromobutylene oxide-1,2, p-chloromethyl styrene oxide and the like. Also included are 1,1-dichloro-2,3-epoxypropane, 1,1,1 - trichloro - 2,3 - epoxypropane, 1,1,1-trifluoro - 2,3 - epoxypropane, 1 - bromo - 1,1-dichloro-2,3-epoxypropane, 1,1 - dichloro-1-fluoro-2,3-epoxypropane, 1,1 - difluoro - 1 - chloro-2,3-epoxypropane, other mixed 1,1,1 - trihalo - 2,3 - epoxypropanes, 1,1,1 - tribromo-3,4-epoxybutane, 1,1,1-trichloro-3,4-epoxybutane, 1,1-dichloro - 3,4 - epoxybutane, 1,1,1,2,2 - pentachloro-3,4-epoxybutane, 1,1,1,4,4-pentachloro-2,3-epoxybutane, 1,1,1,2,2-pentafluoro-3,4-epoxybutane, 1,1,1,2,2-mixed pentahalo-3,4-epoxybutane, etc.

The halogenous epoxy propanes used in the present invention for the preparation of halogenous hydroxy ethers may be prepared by known methods such as by the dehydrohalogenation of the appropriate halogenated secondary alcohol in sodium hydroxide solution. For example, 1,1-dichloro-2,3-epoxypropane may be prepared by the dehydrohalogenation of 1,1,3-trichloro-2-propanol. 1,1,1-trichloro-2,3-epoxypropane may be prepared by the dehydrohalogenation of 1,1,1,3-tetrachloro-2-propanol. The halopropanol used in the process may in turn be prepared in known manner by the reduction of the appropriate halogenated acetone with aluminum isopropoxide in isopropanol.

The 1-polyhalogeno-3,4-epoxybutanes may be prepared by reacting the appropriate polyhalomethane with 1-hydroxypropene-2 in the presence of a source of free radicals, and dehydrohalogenating the resulting adduct with a base, as described in Canadian Patent No. 527,462. 1,1,1-trichloro-3,4-epoxybutane may be prepared by the partial dehydrohalogenation of 1,1,1-trichloro-3-bromo-4-butanol in the presence of potassium hydroxide, as disclosed in U.S. Patent No. 2,561,516.

When the halogenous alkylene oxides react, the oxirane ring is opened with the breaking of an oxygen bond to form a bivalent radical wherein the members of the oxirane group form a bivalent linear chain having the halogenous lower-alkyl group, originally attached to a carbon atom of the oxirane ring, as an extra-linear substituent. The bivalent oxyalkylene radical may be bonded through one valence by way of an ether linkage to the hydroxy initiating molecule, or through one or both valences to oxyalkylene radicals to form a polyoxyalkylene chain.

Mixtures of more than one of the above-described halogenous alkylene oxides may be employed, as well as mixtures of the above-described halogenous alkylene oxides with nonhalogenous alkylene oxides. The use of such mixtures is often advantageous in that it may result in an improvement of some of the properties of the polyether, such as viscosity and color. For example, the use of a mixture of 1,1,1-trichloro-2,3-epoxypropane and propylene oxide (2:1 molar ratio) and utilizing trimethylolpropane as a chain initiating compound, results in polyhydroxy polyether products having reduced viscosity, improved color, and improved solubility in low boiling chlorofluoro-hydrocarbons, as for example in the Freons, in comparison to the corresponding polyhydroxy polyethers prepared from 1,1,1-trichloro-2,3-epoxypropane alone. Suitable alkylene oxides which may be used as co-reactants with the halogenous alkylene oxides are the alkylene oxides which are either saturated or free from other than aromatic unsaturation. They include lower-alkylene oxides such as ethylene, propylene, butylene, and isobutylene oxides, dodecene oxide, etc., aromatic alkylene oxides such as styrene oxide, etc., epoxy ethers, and so forth. When mixtures of halogenous and non-halogenous alkylene oxides are used to impart fire resistance into a composition, the amount of the non-halogenous alkylene oxide should be limited. Thus, when a non-halogenous alkylene oxide is employed as part of the starting alkylene oxide reactant, it is preferred that the halogenous alkylene oxide component comprise at least 10% by weight of the mixture.

In general, it has been found that a minimal halogen content of 45% by weight is normally required in the polyether where it is to be used as an intermediate in the preparation of more complex compositions such as polymers having improved fire resistance.

The other reactant employed in the present invention is an alcohol initiating compound. Either mono- or polyhydric alcohols may be used. A preferred class of alcohols is that containing the aliphatic, including cycloaliphatic, alcohols such as methanol, ethanol, isopropanol, butanol, dodecanol, 1,12-dihydroxyoctadecane, cyclohexanol, and polyvinyl alcohol, and especially the lower-aliphatic alcohols having from two to ten carbon atoms and from two to eight hydroxy groups, such as ethylene glycol, propylene glycol, and hexanetriol.

Representative polyhydric alcohol initiators include glycols such as ethylene glycol, propylene glycol, isobutylene glycol, trimethylene glycol, butanediol-2,3, 1,4-dihydroxy-2-butene, 1,12-dihydroxyoctadecane, 1,4-dihydroxycyclohexane, 2,2-dimethyl-1,3-propanediol, 2-ethyl-2-butylpropanediol-1,3, polyols such as glycerine, erythritol, sorbitol, mannitol, inositol, trimethylolpropane, pentaerythritol, as well as polyvinyl and polyallyl alcohol, bis-(4-hydroxycyclohexyl)-dimethylmethane, tetramethylolcyclohexanol, 1,4-dimethylolbenzene, 4,4'-dimethyloldiphenyl, dimethylolxylenes, dimethyloltoluenes, dimethylolnaphthalenes, etc.; halogen-substituted polyols such as glycerine monochlorohydrin, 1,4-dichloro-2,3-hydroxybutane, 2,2,3,3-tetrachlorobutanediol-1,4, 3,3,3-trichloro-1,2-propylene glycol, 3,3-dichloropropanediol-1,3, monochlorohydrin of pentaerythritol, monochlorohydrins of sorbitol, dichlorohydrins of sorbitol, monochlorohydrins of mannitol, dichlorohydrins of mannitol, those glycols corresponding to the polyhalogenated alkylene oxide employed, etc.; polyhydric ether alcohols such as diglycerol, triglycerol, dipentaerythritol, tripentaerythritol, dimethylolanisoles, methyl ether of glycerine, isopropyl thioether of glycerine, condensates of alkylene oxides such as ethylene oxide, propylene oxide, butylene oxide, epichlorohydrin, glycidyl ethers, etc., with polyhydric alcohols such as the foregoing and with polyhydric thioether alcohols such as 2,2'-dihydroxy-diethylsulfide, 2,2',3,3'-tetrahydroxydipropylsulfide, 2,2',3-trihydroxy-3'-chlorodipropylsulfide, etc.; hydroxy aldehydes and ketones such as dextrose, fructose, maltose, glyceraldehyde, sucrose, etc.; hydroxy esters such as monoglycerides, monoesters of pentaerythritol, etc. Additionally, hydroxy aromatic compounds such as phenol, cresol, orcinol, xylorcinol, resorcinol, and the like may be used.

One of the primary considerations in selecting a hydroxy initiating compound is the functionality desired in the hydroxy ether product. An examination of the structure of the products obtained confirms the fact that the functionality of a hydroxy ether is the same as the functionality of the initiating compound used to prepare it. For example, when a triol is used as the hydroxy initiating compound, a trihydric ether is obtained as the end product. When a tetrol is used as the initiating compound, a tetrahydric ether is obtained. When these ethers are to be used in the preparation of polyurethanes, the degree of functionality directly influences the degree of cross-linking in the polyurethane composition and, consequently, the rigidity and hardness of the product. In general, the greater the degree of cross-linking, the harder and more rigid the product. Consequently, more highly functional polyhydroxy polyethers are normally preferred when preparing hard, rigid polyurethane products. When softer, more flexible polyurethane foams are desired, less highly functional polyhydroxy ethers, such as dihydric ethers, should be utilized, and consequently, less highly functional polyhydroxy initiating compounds should be employed for the preparation of the polyethers.

By controlling the proportions of alkylene oxide to hydroxy initiating compounds, it is generally possible to limit the degree of addition and, consequently, the molecular weight of the products. Molar excesses of polyhydroxy initiating compound are preferred when the mono adduct is desired. Adducts having an average composition of one alkylene oxide unit per hydroxy group of the polyhydroxy initiating compound can be obtained by reacting the alkylene oxide with the hydroxy initiating compound in a ratio of one mole of alkylene oxide per hydroxy group of the initiating compound. For example, a three to one adduct of 1,1,1-trichloro-2,3-epoxypropane and glycerine is obtained by reacting three moles of the alkylene oxide with one mole of triol. Higher polymeric products are obtained if the molar ratio of oxide to hydroxy compound is increased still further.

In general, it is preferred to use a ratio of about 1 to 4 moles of alkylene oxide for each equivalent weight of hydroxy initiating compound based on the hydroxyl group equivalency. Thus, for example, the preferred ratios of alkylene oxide to glycerine are in the range of from about 1:1 to 12:1.

Since the products of the invention are alcohols, it is also possible to employ the product of one condensation as the alcohol initiating compound of another condensation. High molecular weight polyethers may be obtained according to this aspect of the invention.

The catalyst employed in the process of the present invention is an aluminum alcoholate of the same alcohol as is employed as the initiating compound for reaction with the halogenous alkylene oxide. For example, if ethyl alcohol is used as the initiating compound, the catalyst utilized is aluminum ethoxide, and if glycerine is used as the initiating compound, the catalyst used is an aluminum triglycerate.

The catalysts of the present invention may be prepared in any one of a number of methods known in the art. The general equations of several of the common methods are listed below:

(1) Reaction of metallic aluminum with alcohol:

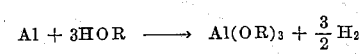

(2) Radical exchange with the starting alcohol:

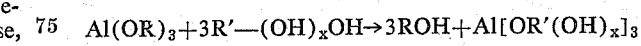

This process is especially useful for the manufacture of alcoholates of the preferred lower-aliphatic polyhydric alcohols. The lower-aliphatic polyhydric alcohol is reacted with the aluminum alcoholate of an alcohol having a lower boiling point than that of the lower-aliphatic polyhydric alcohol. Examples of such alcoholates are aluminum isopropoxide and aluminum ethoxide. During the reaction the radicals of the lower-boiling alcohols are replaced by the radicals of the lower aliphatic polyhydric alcohols, and the lower-boiling alcohols are distilled off.

(3) Salt replacement of an alkali metal (Me') alcoholate:

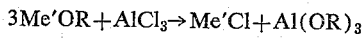

The catalyst is usually produced in phase with the alcohol and, since the aluminum alcoholate is very often not soluble in the alcohol, the normal procedure is to form an emulsion and maintain it by stirring during the reaction to keep the reactants in close proximity.

According to the invention, the halogenous alkylene oxide and alcohol initiating compound are reacted together in the presence of an aluminum alcoholate produced by any of the methods described above, the alcoholate comprising a radical of the alcohol initiating compound used in the reaction. The polymerization reaction may be carried out in a variety of ways. In one process, the catalyst is added to a mixture of alkylene oxide and initiating compound. A mildly exothermic reaction generally results, the temperature of which can be controlled by external cooling. The mixture is maintained at a suitable reaction temperature for a period of time until the reaction goes to completion. The product is then recovered by any convenient procedure, as for example, vacuum distillation. In a variation of this method, a mixture of the halogenous alkylene oxide and hydroxy initiating compound is initially reacted in the presence of the reaction catalyst, and then treated with additional alkylene oxide or hydroxy initiating compound, or both.

In an alternative process the alkylene oxide is added gradually over a period of time to a mixture of the catalyst and the initiating compound. This method has the advantage that the alkylene oxide may be added at such a rate that the heat of the exothermic reaction maintains the reaction mixture at a satisfactory temperature without the need for external heating or cooling. In a still further variation, a mixture of all or part of the reactants is added gradually to the reaction zone. This procedure may be used whether one or more halogenous alkylene oxides or mixtures thereof with non-halogenous alkylene oxides are employed as reactants.

Any temperature within a wide range of from about 25° to about 300° C. may be used for the reactions according to the invention, a preferred range being from about 60° to about 200° C., with an optimum range of about 140° to about 160° C.

After the reactions described above have gone to completion, the reaction product may be recovered by any suitable means, such as distillation under vacuum or extraction with solvents.

The production of monoethers may be achieved by employing one mole of alcohol with up to one mole of alkylene oxide for each hydroxy group of the alcohol. Although any amount of catalyst may be employed, preferred results are obtained by employing an amount of aluminum alcoholate catalyst in which the weight of the aluminum is equal to at least about 1%, and preferably from about 3% to about 10% of the weight of the alcohol initiating compound.

Polymerization usually results from employing one mole of alcohol and more than 1 mole of alkylene oxide for each hydroxy group of the alcohol. Again, any amount of catalyst may be employed, but the reaction rate with small amounts of catalyst is relatively slow and inefficient. It is therefore preferred that the catalyst of the invention be utilized in an amount wherein the weight of the aluminum is at least about 10% of the weight of the alcohol initiating compound for polymerization reactions. The proportions of the catalyst are expressed herein in terms of the weight of the aluminum metal itself. It has in fact been observed that the aluminum atoms themselves appear to be active in providing the desired catalytic effect.

Although the aluminum alcoholate catalyst may be used as the sole catalyst, it has been found to be desirable in many applications to employ as a co-catalyst a catalytic amount of titanium chloride. The amount of the co-catalyst should not exceed about one equivalent based on the amount of aluminum alcoholate catalyst. An amount of titanium tetrachloride in the range of about 0.01% to about 3% by weight based on the aluminum alcoholate catalyst is suitable. Utilization of the co-catalyst together with the aluminum alcoholate catalyst results in the attainment of a polymeric product of higher molecular weight.

The process of the present invention is preferably carried out in the absence of an additional solvent, although solvents such as benzene, n-hexane, or the like may be utilized.

The pressure at which the process is conducted may be atmospheric, less-than-atmospheric, or greater-than-atmospheric. Each condition has its own specific advantage. Atmospheric pressure does not require special equipment, greater-than-atmospheric pressure increases conversions of starting epoxide and molecular weight of the final product, and less-than-atmospheric pressure allows the reaction to be conducted with greater accuracy. Since many of the starting halogenous alkylene oxides boil at the reaction temperature when reduced pressure is employed, cessation of boiling indicates conversion of the starting epoxide and, thus, completion of the reaction.

The reaction products obtained from the reactions described above are generally viscous oils containing various impurities, the most common of which consist of unreacted halogenous alkylene oxides and aluminum alcoholate catalyst. The aluminum alcoholate may be conveniently removed by treating the crude oil with an aqueous solution of an acid and subsequently filtering off the precipitated salt. The remaining oil may then be heated under reduced pressure to drive off all impurities such as water and alkylene oxide. After the excess acid is neutralized, as with sodium bicarbonate, the precipitated solids may be removed by filtration. Excessive color of the products may be reduced by bleaching with chlorine gas. Other methods of purification known in the art may also be employed and are generally satisfactory.

It is well known in the field of alkylene oxide chemistry that when a reactive hydrogen compound or initiating compound is subjected to oxyalkylation, a compound is produced which is in fact a polymer of the alkylene oxide having the reactive hydrogen compound as a terminal group. Further, when a large relative proportion of alkylene oxide to reactive hydrogen compound is used, the reaction product is not a single molecular compound having a defined number of oxyalkylene radicals, but rather a mixture of closely related or touching or adjacent homologs wherein the statistical average number of oxyalkylene groups equals the relative number of moles of the alkylene oxide employed, and the individual members present in the mixture containing varying numbers of polyoxyethylene groups. Thus, the compositions of this invention are mixtures of compounds which are defined by molecular weight and weight percent. For convenience in referring to such products as are produced by the process of the present invention, the term "cogeneric mixture" is employed. This term has been coined to designate the mixture of a series of closely related homologs that is obtained by condensing a plurality of alkylene oxide units with a reactive hydrogen compound. The term is defined in greater detail in U.S. Patent 2,549,438.

Various types of products may be obtained in utilizing the process of the present invention by appropriately selecting the reactants and reaction conditions. For example, when a single alkylene oxide, such as a halogen-containing alkylene oxide, is reacted with a monofunctional active hydrogen-containing initiating compound, the resulting molecules have a structure in the form of a chain comprised of a halogenous alkylene oxide segment terminated by an initiating compound segment. When polyfunctional initiating compounds are utilized, each functional group of the initiating compound terminates a halogenous alkylene oxide segment. The sizes of the alkylene oxide segments are generally proportional to the molar ratio of the reactant materials.

When two or more different alkylene oxides are utilized, such as halogenous and non-halogenous alkylene oxides, the structure of the ether molecules may be one of several different types, depending upon the nature of the process used. Where both alkylene oxides are mixed together and simultaneously reacted with the initiating compound, the resulting product has a structure that is commonly termed a "heteric" structure, that is, a structure in which the different individual alkylene oxide segments are randomly distributed throughout the polyoxyalkylene portion of the molecular chain. Alternatively, when a sequential procedure is employed and one of the alkylene oxides is first reacted with the initiating compound, and the other subsequently added and reacted, a molecular structure is formed which is commonly referred to as of the "block" or "conjugated" type. In this structure the molecular chain is comprised of a block of one polyoxyalkylene segment connected to a block of the other polyoxyalkylene segment, thus providing a conjugated or repeated unit structure.

The following examples are given by way of illustration only and are not to be construed as limiting.

*Example 1*

A 1-liter reaction flask is fitted with a stirrer, thermometer, and distillation head, and is flushed with nitrogen. One-fourth mole (50 grams) of aluminum isopropylate and 1.08 moles (100 grams) of glycerine are introduced into the reaction flask, and the flask is then heated to distill off the isopropyl alcohol. When no more alcohol can be distilled off under these conditions, the pressure within the flask is reduced to less than 10 millimeters of mercury and the mixture heated to 100° C. When the last traces of isopropyl alcohol have been removed by following this procedure, the distillation head is replaced with a reflux condenser and with an addition funnel containing 4 moles (511 grams) of 1,1-dichloro-2,3-epoxypropane. The reaction mixture is heated to 130 to 150° C. and maintained at that temperature as the 1,1-dichloro-2,3-epoxypropane is added dropwise. When all of the 1,1-dichloro-2,3-epoxypropane has been added, the pressure within the reaction flask is reduced in order that the completion of the reaction may be readily observed. The reaction is considered complete when all reflux and boiling cease (under the conditions employed). The resulting liquid is treated with an aqueous solution of phosphoric acid to precipitate the aluminum as aluminum phosphate, which precipitate is immediately filtered off. The remaining reaction product is neutralized with sodium bicarbonate. Water, unreacted epoxypropane, and other volatile impurities are removed by heating the mixture to a temperature of 115 to 125° C. under a reduced pressure of less than 10 millimeters of mercury. The precipitated solids are removed by filtration, leaving the desired product which has an average molecular weight of from about 352 to about 386, as determined by hydroxyl number.

*Example 2*

A condensation is carried out according to Example 1 employing 1.08 moles (82 grams) of propylene glycol, aluminum propylene glycolate containing 9 grams of aluminum, 14.1 moles (2080 grams) of 1,1-dichloro-2,3-epoxypropane and a catalytic amount of titanium tetrachloride. The resulting product has an average molecular weight of approximately 1050 as determined by hydroxyl number.

*Example 3*

Fifteen (15) grams (0.2 mole) of propylene glycol containing 1 gram (0.004 mole) of aluminum propylene glycolate is introduced into a reactor which is fitted with a stirrer and a dropping funnel. The reaction flask is adjusted to a temperature of 130 to 160° C. and 93.5 grams (0.75 mole) of 1,1-dichloro-2,3-epoxypropane is added over a period of 10 hours. The product is treated with phosphoric acid, filtered, and stripped of volatile impurities under reduced pressure. A viscous brown oil is obtained which has an average molecular weight of about 256.

*Example 4*

Eighteen grams (0.17 mole) of the halogenous hydroxy ether product of Example 3 is introduced into a reactor together with 4 grams (0.0465 mole) of aluminum isopropoxide. The mixture is heated to 100° C. to drive off the isopropyl alcohol which is formed. To the mixture of aluminum alcoholate and ether product, 52 grams (0.4 mole) of 1,1-dichloro-2,3-epoxypropane are added together with a catalytic amount of titanium tetrachloride at a temperature of 140 to 150° C. over a period of 10 hours. The product is treated with phosphoric acid and stripped of volatile impurities under reduced pressure to give 65 grams of purified product having an average molecular weight of about 569.

*Example 5*

A mixture containing 100 grams (1.12 moles) of glycerine and 50 grams (0.16 mole) of aluminum isopropoxide is heated with stirring to a temperature of 100° C. When all of the isopropanol has been distilled off, 37.5 grams (0.3 mole) of 1,1-dichloro-2,3-epoxypropane is added over a period of 4 hours. The product is treated with phosphoric acid, filtered and stripped under reduced pressure. A purified product weighing 69 grams, having a hydroxyl number of about 568, corresponding to an average molecular weight of 300, a bromine number of 2, and containing 41 percent chlorine by weight, is obtained.

*Example 6*

One hundred grams of glycerine containing 7 grams of aluminum as aluminum triglycerate are introduced into a reaction flask. The mixture is adjusted to a temperature of 135 to 154° C. and 511 grams (4 moles) of 1,1-dichloro-2,3-epoxypropane is added over a period of 10 hours. The product is treated with phosphoric acid and stripped under reduced pressure. After stripping, the molecular weight of the product is obtained by the hydroxyl number method. The product (404 grams) has an average molecular weight of about 527.

*Example 7*

In the same manner as described in Example 1, three molar proportions of 1,1,1-trichloro-2,3-epoxypropane are condensed with 1 molar proportion of glycerine, utilizing aluminum triglycerate as a catalyst. The product is similar to those of the previous examples.

*Example 8*

In the same manner as described in Example 1, three molar proportions of 1,1,1,3,3-pentachloro-2,3-epoxypropane are condensed with 1 molar proportion of glycerine, utilizing aluminum triglycerate as a catalyst. The product is similar to that of the previous examples.

Example 9

In the same manner as described in Example 1, 3 molar proportions of 1,1,1-tribromo-2,3-epoxypropane are condensed with 1 molar proportion of glycerine, utilizing aluminum triglycerate as a catalyst. The product is similar to that of the previous examples.

Example 10.—Comparison example utilizing prior art process

Utilizing the apparatus as described in Example 1, 100 g. of glycerine are introduced into the reaction flask. Potassium hydroxide in an amount of about 5% by weight based on the glycerine is added thereto. The reaction mixture is heated to a temperature of from about 130° to 150° C. and maintained at that temperature while 4 moles (511 g.) of 1,1-dichloro-2,3-epoxypropane are added dropwise over a period of time. A black tar forms which resists all attempts at purification by normal methods.

Example 11

One-fourth mole of aluminum isopropylate and 1.08 moles of glycerine are placed in a one-liter reaction flask prepared as in Example 1. The flask is heated to distill off the isopropyl alcohol. The pressure within the flask is then reduced to less than 10 millimeters of mercury and the mixture heated to 100° C. After the isopropyl alcohol has been completely removed 2 moles of 1,1-dichloro-2,3-epoxypropane and 2 moles of propylene oxide are added while the reaction mixture is maintained at from 130° to 150° C. The mixture is treated with an aqueous solution of phosphoric acid to remove the aluminum, and the remaining product is then neutralized with sodium bicarbonate. It is then heated to a temperature of 115° to 125° C. to remove water, unreacted alkylene oxides, and other volatile impurities. The precipitated solids are removed by filtration, leaving the end product.

It is to be understood that the invention is not to be limited to the exact details of operation or exact compounds shown and described, as obvious modificaions and equivalents will be apparent to one skilled in the art, and the invention is therefore to be limited only by the scope of the appended claims.

I claim:

1. A process for the production of halogenous hydroxy ethers which comprises reacting together at a temperature of about 25 to about 300 degrees C. (1) a polyhydric alcohol initiating compound having a maximum of 8 hydroxy groups and (2) a halogenous alkylene oxide in the presence of (3) a reaction catalyst comprising an aluminum alcoholate of an alcohol which is the same as said alcohol initiating compound (1), said catalyst (3) being present in an amount such that the weight of the aluminum therein is at least 1% of the weight of the alcohol initiating compound.

2. A process according to claim 1, wherein said catalyst is present in an amount such that the weight of the aluminum therein is at least 3% of the weight of the alcohol initiating compound.

3. A process according to claim 1, wherein the reaction is carried out at a temperature within the range of about 140° to about 160° C.

4. A process according to claim 1, wherein said alcohol initiating compound (1) is glycerine and said catalyst (3) is aluminum triglycerate.

5. A process according to claim 1, wherein said alcohol initiating compound (1) is propylene glycol and wherein said catalyst (3) is aluminum propylene glycolate.

6. A process according to claim 1, wherein said alkylene oxide (2) is a 1-halo-2,3-epoxypropane.

7. A process according to claim 1, wherein said alkylene oxide (2) is 1,1-dichloro-2,3-epoxypropane.

8. A process according to claim 1, wherein said alkylene oxide (2) is 1,1,1-trichloro-2,3-epoxypropane.

9. A process according to claim 1, wherein said alkylene oxide (2) is a 1-halo-epoxybutane.

10. A process according to claim 1, wherein said initiating compound (1) is glycerine, said alkylene oxide (2) is 1,1-dichloro-2,3-epoxypropane, and said catalyst (3) is aluminum triglycerate.

11. A process according to claim 1, wherein said initiating compound (1) is propylene glycol, said alkylene oxide (2) is 1,1-dichloro-2,3-epoxypropane, and said catalyst (3) is aluminum propylene glycolate.

12. A process according to claim 1, wherein said initiating compound (1) is glycerine, said alkylene oxide (2) is 1,1,1-trichloro-2,3-epoxypropane, and said catalyst (3) is aluminum triglycerate.

13. A process according to claim 1, wherein said initiating compound (1) is glycerine, said alkylene oxide (2) is 1,1,1-trichloro-2,3-epoxybutane, and said catalyst (3) is aluminum triglycerate.

14. A process for the production of halogenous hydroxy ethers which comprises reacting together at a temperature of about 25 to about 300 degrees C. a polyhydric alcohol initiating compound having a maximum of 8 hydroxy groups, (2) a halogenous alkylene oxide, (3) a non-halogenous alkylene oxide, and (4) a reaction catalyst comprising an aluminum alcoholate of an alcohol which is the same as said alcohol initiating compound (1), said catalyst (4) being present in an amount such that the weight of the aluminum therein is at least 1% of the weight of the alcohol initiating compound.

15. A process according to claim 14, wherein said alkylene oxide (3) is propylene oxide.

16. A process according to claim 14, wherein said initiating compound (1) is glycerine, said halogenous alkylene oxide (2) is 1,1-dichloro-2,3-epoxypropane, and said catalyst (4) is aluminum triglycerate.

17. A process according to claim 14, wherein said initiating compound (1) is propylene glycol, said alkylene oxide (2) is 1,1-dichloro-2,3-epoxypropane, said alkylene oxide (3) is propylene oxide, and said catalyst (4) is aluminum propylene glycolate.

18. A process according to claim 14, wherein said halogenous alkylene oxide (2) and said alkylene oxide (3) are simultaneously reacted together with said alcohol initiating compound (1).

19. A process according to claim 14, wherein said halogenous alkylene oxide (2) and said alkylene oxide (3) are sequentially reacted with said alcohol initiating compound (1).

References Cited by the Examiner

UNITED STATES PATENTS 3,135,705    6/1964    Vandenberg _____ 260—2

FOREIGN PATENTS 645,546    7/1962    Canada.

OTHER REFERENCES

Polyethers, part I, vol. XIII Gaylord (7/1963, pp. 148, 233 relied on).

WILLIAM H. SHORT, *Primary Examiner.*

M. T. PERTILLA, *Assistant Examiner.*